Figure 1A:
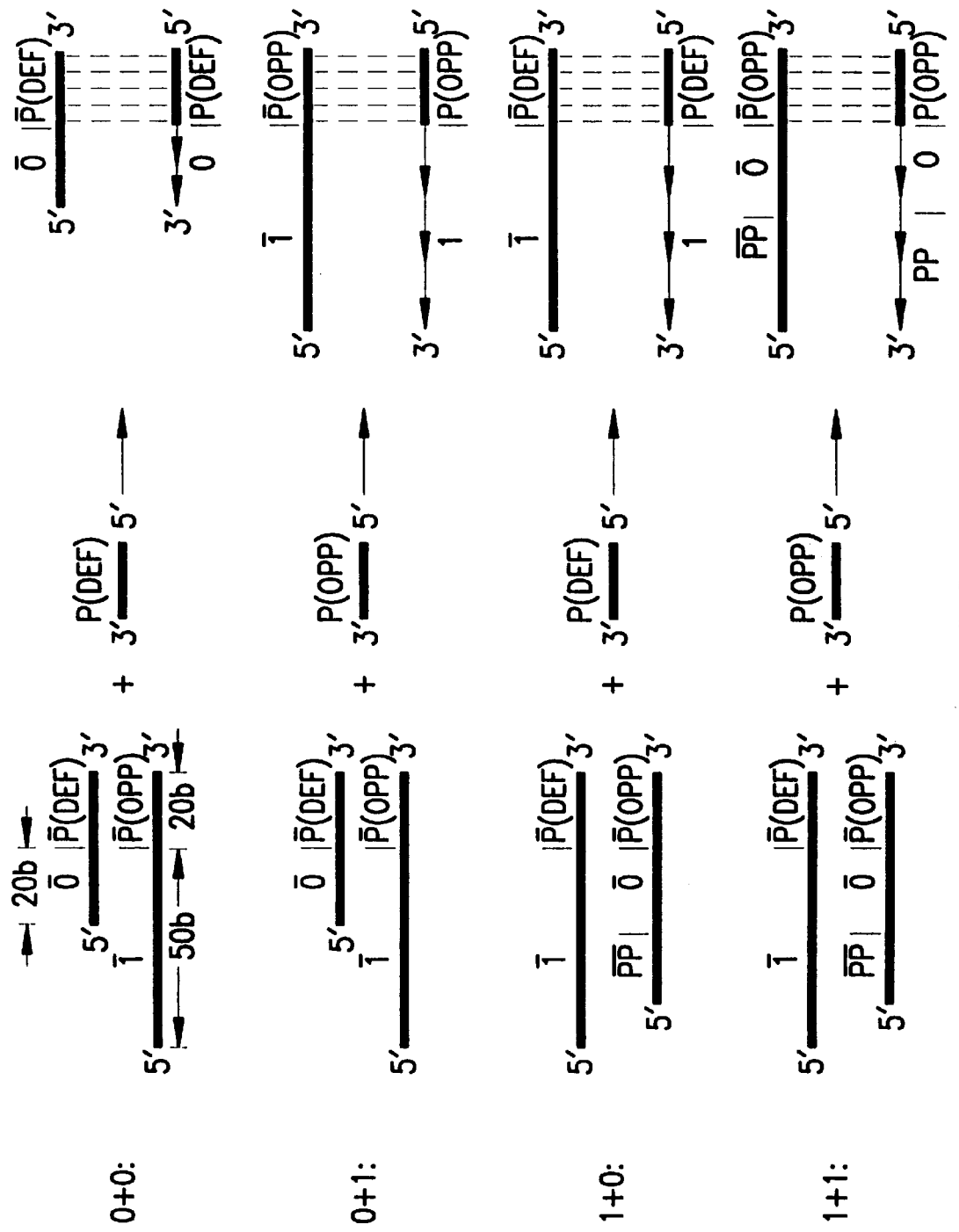

United States Patent [19]
Guarnieri et al.

[11] Patent Number: 5,955,322
[45] Date of Patent: Sep. 21, 1999

[54] DNA-BASED COMPUTER

[75] Inventors: Frank Guarnieri, Brooklyn; Frank Carter Bancroft, Huntington, both of N.Y.

[73] Assignee: Mount Sinai School of Medicine of the City University of New York, N.Y.

[21] Appl. No.: 08/597,948

[22] Filed: Feb. 7, 1996

[51] Int. Cl.[6] .............................. C12P 19/34; C12Q 1/68; G06G 7/58

[52] U.S. Cl. ......................... 435/91.1; 435/6; 435/91.2; 364/496; 364/497; 364/498; 364/499

[58] Field of Search .......................... 435/6, 91.1, 91.2; 364/496, 497, 498, 499

[56] References Cited

U.S. PATENT DOCUMENTS 4,683,202  7/1987  Mullis ................................ 435/91.2

OTHER PUBLICATIONS

Guarnieri et al. Science 273:220–223, Jul. 12, 1996.
Lipton, R. Science 268:542–545, Apr. 28, 1995
Adleman et al. Science 266:1021–1024, Nov. 11, 1994.
Zhang et al. Computer Applications in the Biosciences 10(3):309–317, 1994.

*Primary Examiner*—W. Gary Jones
*Assistant Examiner*—Paul B. Tran
*Attorney, Agent, or Firm*—Baker & Botts, L.L.P.

[57] ABSTRACT

The present invention relates to a DNA-based computer which is able to perform mathematical calculations such as addition as well as logical operations. It is based, at least in part, on the discovery that DNA molecules can be used to perform operations analogous to "bit-flipping" in computers. This capability, referred to herein as "molecular bit-flipping", derives from the complementary nature of DNA sequences. According to the present invention, input data are each represented by single-stranded DNA molecules. Complementary DNA sequences are incorporated such that input molecules, which bear a relationship defined by the operation, hybridize and permit one or more template DNA strands to serve as templates for primer extension. Primer extension, in turn, creates a result DNA molecule which represents the output data, and may be read using straight-forward molecular biological techniques.

6 Claims, 10 Drawing Sheets

FIRST DIGIT $2^0$ Position $$0 = \left\{ \begin{array}{l} 5' \; \overline{\overline{DEF(0,1)|\overline{0}(0)|} \; \overline{DEF(0)}} \; 3' \\ 5' \; \overline{\overline{DEF(0,1)|\overline{1}(0)|} \; \overline{OPP(0)}} \; 3' \end{array} \right. \quad 1 = \left\{ \begin{array}{l} 5' \; \overline{\overline{DEF(0,1)|\overline{1}(0)|} \; \overline{DEF(0)}} \; 3' \\ 5' \; \overline{\overline{OPP(0,1)|\overline{0}(0)|} \; \overline{OPP(0)}} \; 3' \end{array} \right.$$

SECOND DIGIT $$0 = \left\{ \; 3' \; \overline{\overset{DEF(0)}{\rule{2cm}{0.4pt}}} \; 5' \quad\quad 1 = \left\{ \; 3' \; \overline{\overset{OPP(0)}{\rule{2cm}{0.4pt}}} \; 5' \right.\right.$$

FIG. 3A

FIRST DIGIT $2^1$ Position $$0 = \left\{ \begin{array}{l} 5' \; \overline{\overline{DEF(1,2)|\overline{0}(1)|} \; \overline{DEF(1)}} \; \sqcup \; 3' \\ 5' \; \overline{\overline{DEF(1,2)|\overline{1}(1)|} \; \overline{OPP(1)}} \; \sqcup \; 3' \\ 5' \; \overline{\overline{OPP(1,2)|\overline{0}(1)|} \; \overline{CAR(1)}} \; \sqcup \; 3' \end{array} \right. \quad 1 = \left\{ \begin{array}{l} 5' \; \overline{\overline{DEF(1,2)|\overline{1}(1)|} \; \overline{DEF(1)}} \; \sqcup \; 3' \\ 5' \; \overline{\overline{OPP(1,2)|\overline{0}(1)|} \; \overline{OPP(1)}} \; \sqcup \; 3' \\ 5' \; \overline{\overline{OPP(1,2)|\overline{1}(1)|} \; \overline{CAR(1)}} \; \sqcup \; 3' \end{array} \right.$$

SECOND DIGIT $$0 = \left\{ \begin{array}{l} 5' \; \overline{\overline{DEF(1)}|\overline{DEF(0,1)}} \; \sqcup \; 3' \\ 5' \; \overline{\overline{OPP(1)}|\overline{OPP(0,1)}} \; \sqcup \; 3' \end{array} \right. \quad 1 = \left\{ \begin{array}{l} 5' \; \overline{\overline{OPP(1)}|\overline{DEF(0,1)}} \; \sqcup \; 3' \\ 5' \; \overline{\overline{CAR(1)}|\overline{OPP(0,1)}} \; \sqcup \; 3' \end{array} \right.$$

FIG. 3B

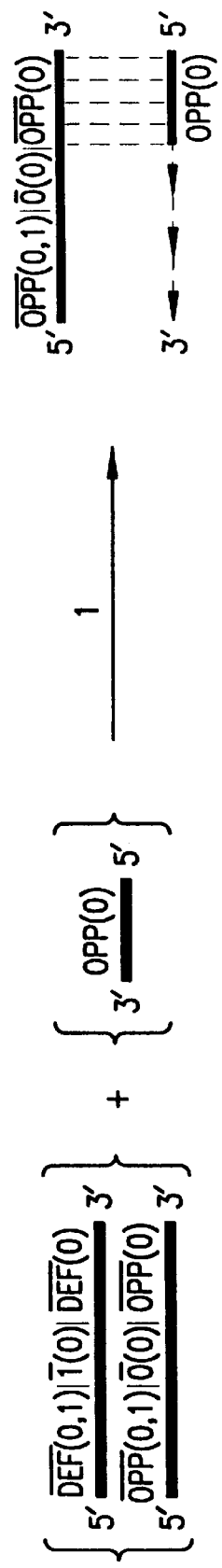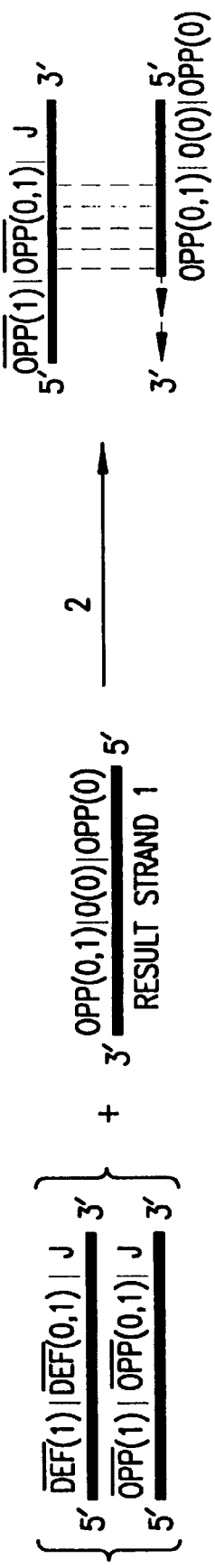

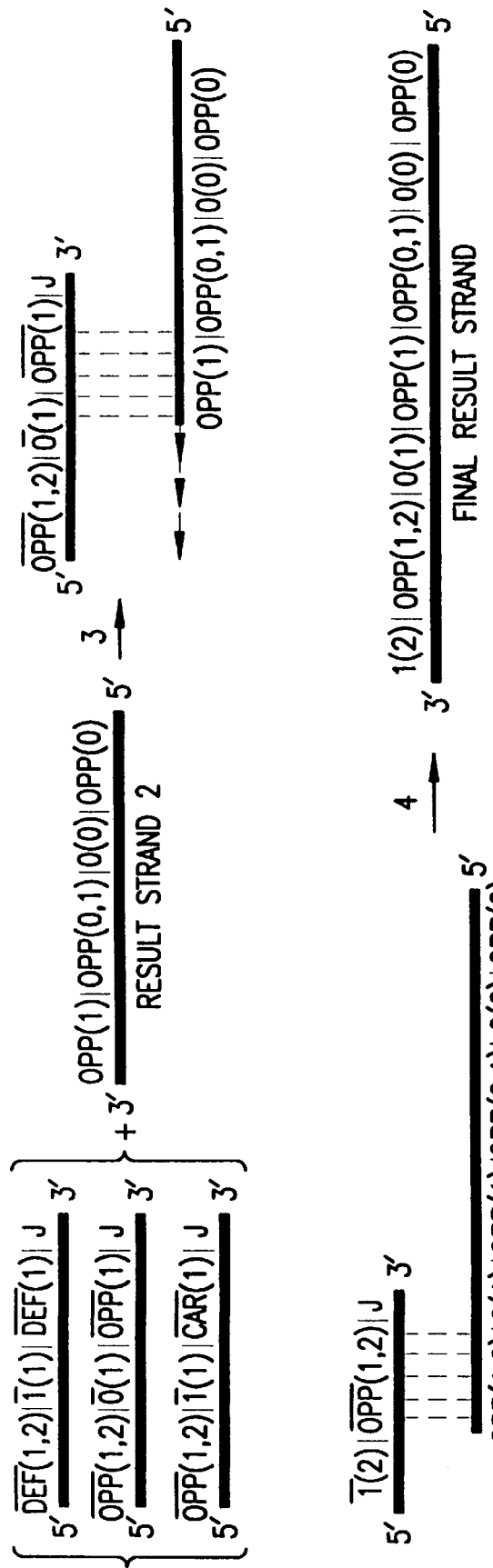

$3^{\underline{0}}$ Position

First Digit $$\left\{\begin{array}{l} 5'\underline{\quad\overline{0}\quad|\ \overline{P(DEF)}\quad}3' \\ 5'\underline{\quad\overline{1}\quad|\ \overline{P(OP1)}\quad}3' \\ 5'\underline{\quad\overline{2}\quad|\ \overline{P(OP2)}\quad}3' \end{array}\right\} = 0$$

$$\left\{\begin{array}{l} 5'\underline{\quad\overline{1}\quad|\ \overline{P(DEF)}\quad}3' \\ 5'\underline{\quad\overline{2}\quad|\ \overline{P(OP1)}\quad}3' \\ 5'\underline{\ \overline{PP}\ |\ \overline{0}\ |\ \overline{P(OP2)}\ }3' \end{array}\right\} = 1$$

$$\left\{\begin{array}{l} 5'\underline{\quad\overline{2}\quad|\ \overline{P(DEF)}\quad}3' \\ 5'\underline{\ \overline{PP}\ |\ \overline{0}\ |\ \overline{P(OP1)}\ }3' \\ 5'\underline{\ \overline{PP}\ |\ \overline{1}\ |\ \overline{P(OP2)}\ }3' \end{array}\right\} = 2$$

Second Digit $$\left\{3'\underline{\quad P(DEF)\quad}5'\right\} = 0$$

$$\left\{3'\underline{\quad P(OP1)\quad}5'\right\} = 1$$

$$\left\{3'\underline{\quad P(OP2)\quad}5'\right\} = 2$$

Placeholder for $3^{\underline{1}}$ Position $$5'\underline{\quad\overline{1}\quad|\ \overline{PP}\ |\ J\ }3'$$

FIG. 8

DNA-BASED COMPUTER

1. INTRODUCTION

The present invention relates to a DNA-based computer which is able to perform mathematical calculations such as addition as well as logical operations. The methods and compositions of the invention may be used to perform extensive calculations in a time-efficient manner using straightforward molecular biological techniques.

2. BACKGROUND

The first use of molecular biology for the solution of a combinatorial problem was published by Adleman in 1994 (Adleman, 1994, Science 266: 1021–1024). Adleman used DNA molecules to solve an example of a directed Hamiltonian path problem. A directed graph with a finite number of vertices ($v_{in}$–$v_{out}$) is said to have a Hamiltonian path if there exists a sequence of one-way edges (i.e., paths) that begins at $v_{in}$ and ends at $v_{out}$, and enters every other vertex only once. To solve this problem, Adleman synthesized a series of DNA oligonucleotides representing the vertices and edges of a graph containing six vertices, and then combined the oligonucleotides in a single ligation reaction. In this way, Adleman generated DNA molecules representing random paths through the graph. He then used a series of molecular biological techniques to (1) select only those paths (i.e., DNA molecules) which begin with $v_{in}$ and end in $v_{out}$; (2) select only those paths that enter 6 vertices (since the graph has 6 vertices); and (3) select only those paths that enter all of the vertices at least once. These procedures, which employed techniques such as polymerase chain reaction ("PCR") and affinity-labeled magnetic bead separation, required a total of approximately seven days of laboratory work.

Recently, this approach has been extended by Lipton to solve a "satisfaction" problem (Lipton, 1995, Science 268: 542). Lipton, essentially using Adleman's techique to formulate all possible solutions of a compound Boolean formula, demonstrated that it may in theory be possible to use molecular biology to extract results that would satisfy the Boolean expression. There are several problems associated with Lipton's approach. First, the necessary laboratory operations would scale linearly with the amount of input, and as the complexity of the problem increases would quickly become impractical to execute. Second, Lipton's formulation is for idealized DNA, and for the use of idealized laboratory operations which he assumes can be expeditiously carried out. Lipton in fact admits that his model of how DNA behaves is "simple and idealized" and "ignores many complex known effects".

The methods of Adleman and Lipton demonstrate that problems corresponding to Boolean formulas can be solved using DNA molecules. However, their methods suffer from a number of severe limitations in addition to those described above.

The methods of Adleman and Lipton cannot be used to solve problems which, given a particular set of input, require a single specific solution. Their methods are directed to search problems, which may be solved by using the input to generate a multitude of possible solutions, and then searching for the desired output. In contrast, binary operations, such as addition, require a control mechanism that produces the single correct solution; two plus two can only equal four.

Using the methods of Adleman and Lipton, the laboratory work required to arrive at an answer to a given problem is technically extremely cumbersome, and essentially involves the purification of a correct molecular result from a random population of erroneous results generated by the computation reaction.

Computers perform binary operations by "bit-flipping", wherein a computer bit may be turned (or "flipped") on and off. The ability to "bit-flip" enables a computer to perform a series of steps, not in a random manner, but with direction. The ability of a bit to be "on" or "off" is analogous to the binary system of numbers, which has only two integers, 1 and 0. When a computer performs addition of the binary numbers 0 and 1, a bit representing the first number, 0, is off; when the second number, 1, is added, the computer effectively "flips" the bit, and like throwing a switch, advances it to the "on" position, to yield the correct sum, 1. Similarly, if the first number is 1 (and therefore the bit is "on") but the second number to be added is also 1, the computer flips the bit to the next position, 0 (i.e., "off"), and "carries the one" (by an algorithm discussed below) to arrive at the correct sum, which is 10. Thus, through bit-flipping, the computer is able to arrive at the correct solution to an addition problem.

The methods of Adleman and Lipton have no such capability. At most, in order to solve an addition problem, these methods would ligate together DNA molecules representing all possible solutions in a "computation reaction", and then it would be necessary to select the correct solution, a project potentially as tedious as if the computation reaction had not been performed in the first place. Their methods suffer similar shortcomings when applied to other operations where nonrandom associations between data points are required.

3. SUMMARY OF THE INVENTION

The present invention relates to a DNA-based computer which is able to perform mathematical calculations such as addition as well as logical operations. It is based, at least in part, on the discovery that DNA molecules can be used to perform operations analogous to "bit-flipping" in computers. This capability, referred to herein as "molecular bit-flipping", exploits both the complementary nature of DNA sequences (which allows the selective association of specific DNA sequences) and the ability of DNA to serve as a template for the synthesis of new DNA molecules (by primer extension).

According to the present invention, input data are each represented by single-stranded DNA molecules. Complementary DNA sequences are incorporated such that input molecules, which bear a relationship defined by the operation, hybridize and generate one or more template DNA strands for primer extension. Primer extension, in turn, creates a result DNA molecule which represents the output data, and may be read using straightforward molecular biological techniques.

3.1. DEFINITIONS

"Input data" refers to the information to be operated upon by the DNA-based computer of the invention, and is encoded on DNA. Distinct features of the data are referred to as "positions" herein. For example, where the operation is addition, the input data consists of numbers, and each number in base X consists of integers at positions $X^0$, $X^1$, $X^2$, etc.

An "input molecule" (also, "input DNA molecule") is a single-stranded DNA molecule which represents an item of input data. In many cases, multiple different input molecules may be required to represent a single item of input data.

A "junk DNA element" ("J") is a portion of an input molecule, located at the 3' terminus of the input molecule, which is designed to be noncomplementary to any other input DNA molecule or to any molecule generated by primer extension reaction according to the invention. The purpose of the junk DNA element is to prevent primer extension of a template strand rather than a result strand.

A "placeholder strand" is an input molecule which may serve as a template for a primer extension reaction only if the result strand of a prior primer extension reaction contains a potential primer element at its 3' terminus which is complementary to at least a portion of the placeholder strand.

An "operator sequence" is either a position operator or position transfer operator (see below).

"Output data" is the result of the operation of the DNA computer of the invention. Like the input data, the characteristics of the output data are referred to as positions having particular values. The output data is read from the final result strand.

A "position operator" is a portion of a single stranded DNA molecule (either an input molecule or a result strand) which may be complementary to a primer for primer extension present in a second single-stranded DNA molecule which is either an input molecule or a result strand. The position operator conveys information relating to the input data at a particular position (see the definition of position transfer operator, below).

A "position transfer operator" is a portion of a single stranded DNA molecule (either an input molecule or a result strand) and which, by virtue of its complementarity with other molecules in the DNA computer, transfers information (and/or identifies relationship) between different positions of the input data.

A "potential primer" ("PP") is a potential creator of a primer which is a portion of a single-stranded DNA molecule, located at the 3' terminus of the molecule, which may be used as a primer for a primer extension reaction under certain circumstances; for example, where the operation is addition, and it is necessary to carry a value from one position to the next.

A "result strand" (also a "result DNA strand") is a single-stranded DNA molecule which is the product of a primer extension reaction according to the invention. The "final result strand" represents the output data.

A "template strand" is a single-stranded DNA molecule which is used as a template for a primer extension reaction according to the invention.

A "value" is the information relating to a particular position of input data, and may be represented by a particular DNA sequence. For example, where the input data is a number in base 10, if the input data is the number two hundred and twelve, the value at the $10^2$ position is 2 (and may be represented by a first specific DNA sequence), the value at the $10^1$ position is 1 (and may be represented by a second specific DNA sequence), and the value at the $10^0$ position is 2 (and may be represented by either a third specific DNA sequence or, alternatively, the first specific DNA sequence, depending on experimental design).

4. DESCRIPTION OF THE FIGURES

Figure 1B:
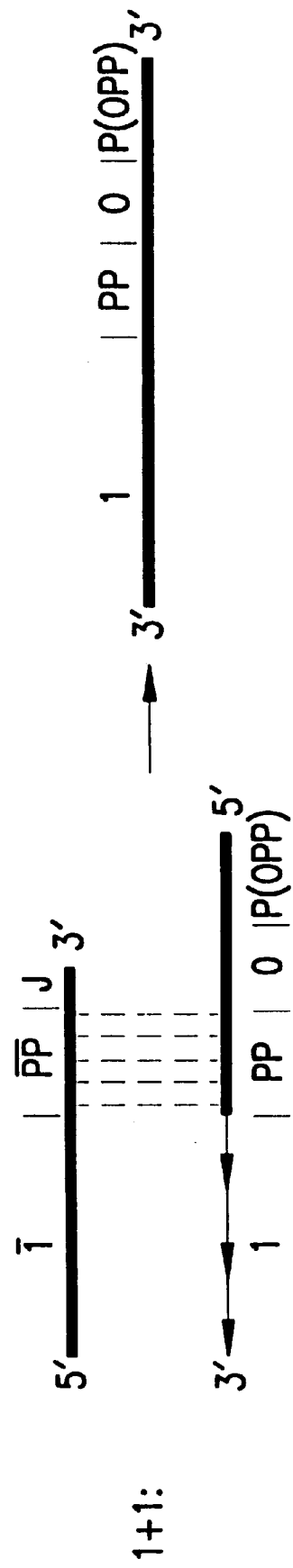

FIGS. 1A and 1B. Illustration of a series of reactions which may be used in a simple DNA-based computer for adding two binary digits.

Figure 2A:
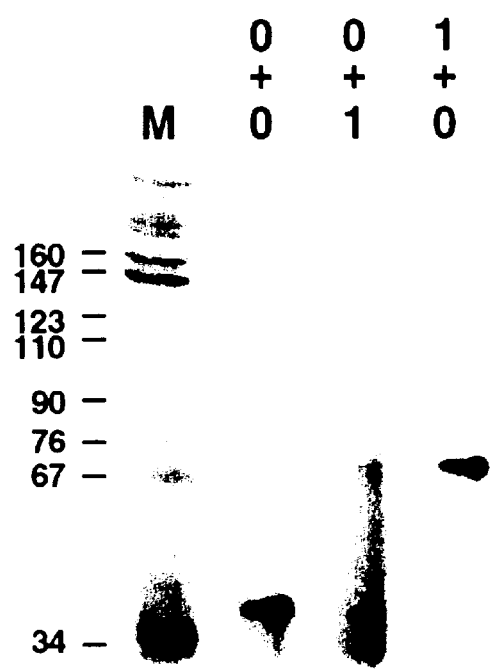
Figure 2B:
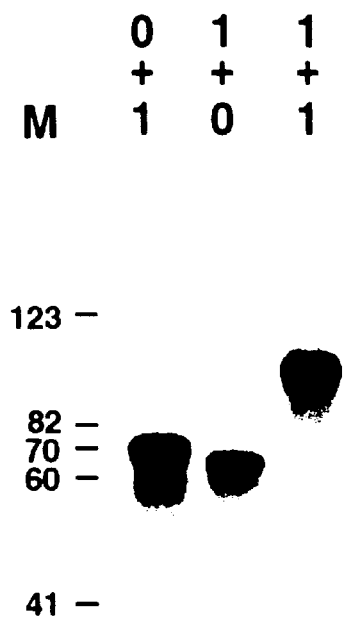

FIGS. 2A and 2B. Autoradiograms of polyacrylamide gel electrophoresis of the products generated by the DNA-based computer in the addition of two binary digits. The lane designated "M" contains single-stranded molecular weight markers; sizes are indicated in bases. (A) Products of each of the first three addition reactions illustrated in FIG. 1A. (B) Products of each of the following reactions: the (0+1) and the (1+0) reaction illustrated in FIG. 1A, and the sequential (1+1) reactions illustrated in FIGS. 1A and 1B.

FIGS. 3A, 3B and 3C. DNA representation of all possible two-digit binary numbers to be added pairwise, showing input molecules representing (A) the $2^0$ position; (B) the $2^1$ position; and (C) the placeholder for the $2^2$ position.

FIGS. 4A and 4B. Illustration of the operation 11+01 as an example of addition of two two-digit binary numbers.

FIG. 5. Truth tables for AND, OR, and NOT, from FIG. 12.2 of Ado et al., 1992, *Foundations Of Computer Science*, W. H. Freeman, New York.

Figure 6A:
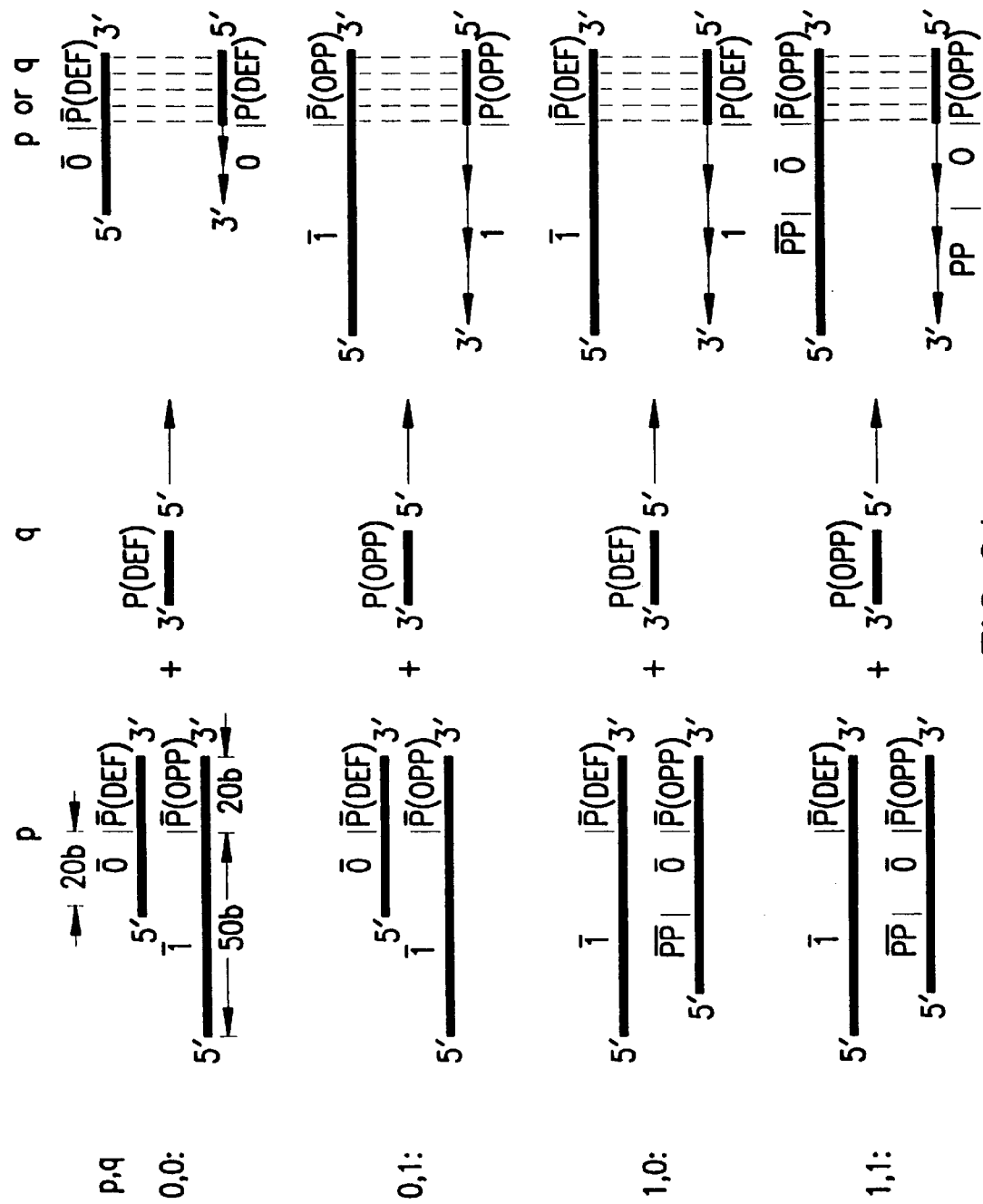
Figure 6B:
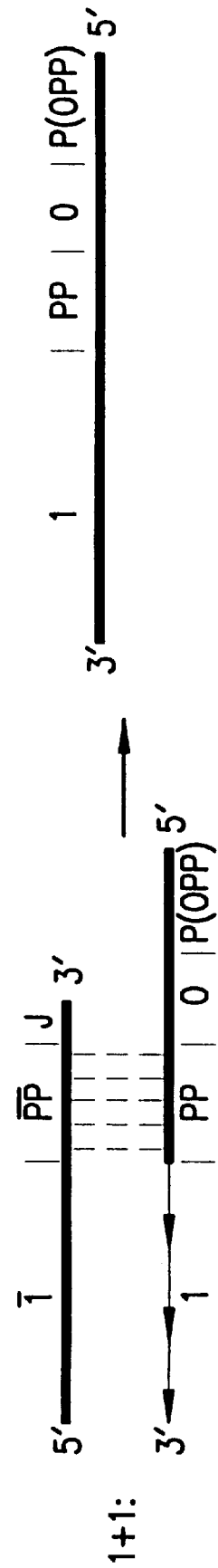

FIGS. 6A and 6B. Use of DNA to Perform the Boolean function OR.

Figure 7:
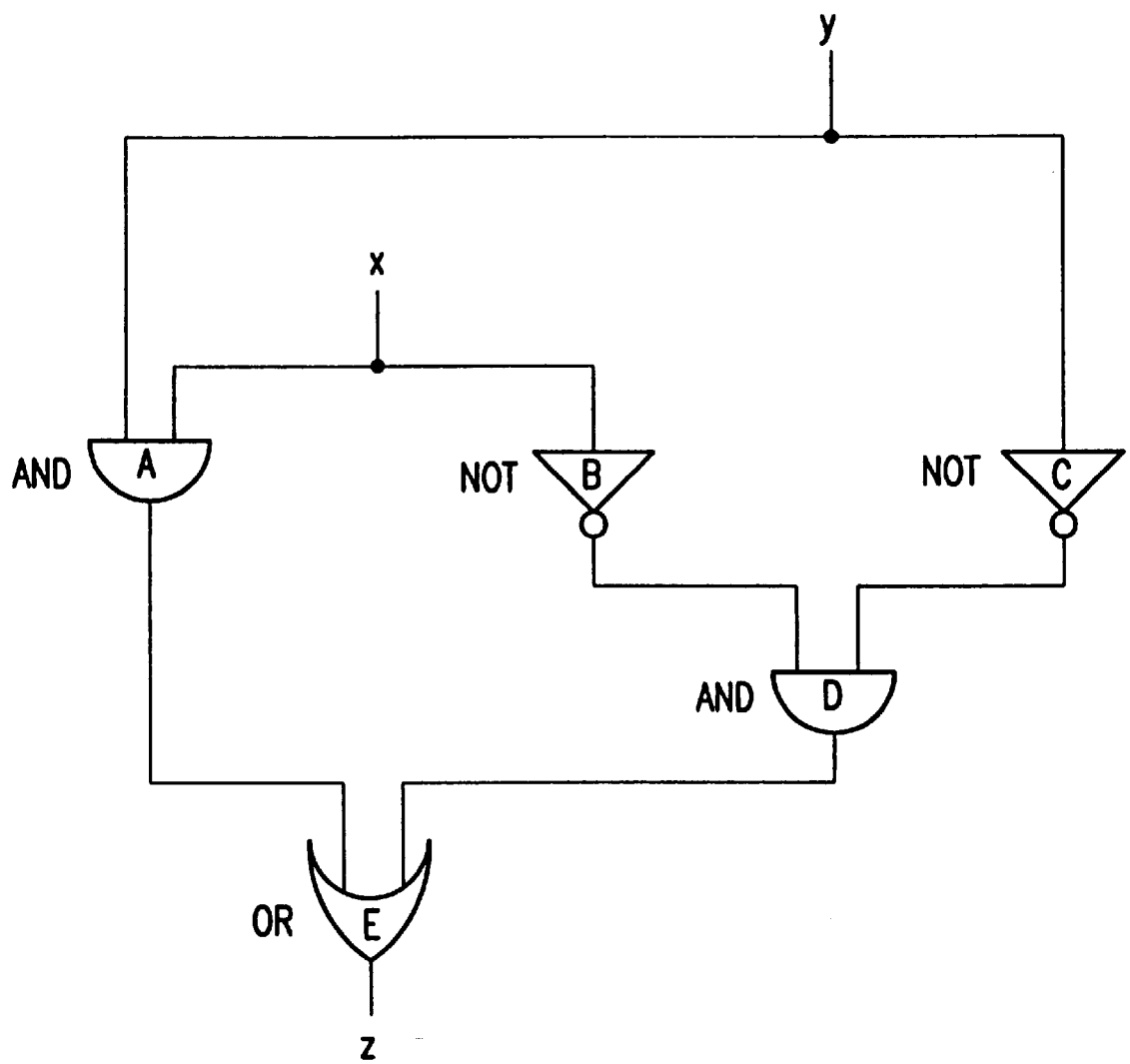

FIG. 7. The EQUIVALENCE Circuit, from FIG. 13.2 of Ado et al., 1992, *Foundations Of Computer Science*, W. H. Freeman, New York.

FIG. 8. Addition of two one digit numbers in base 3.

5. DETAILED DESCRIPTION OF THE INVENTION

The present invention relates to a DNA-based computer which performs an operation on one or more items of input data to generate a specific result, comprising a plurality of input molecules which represent the input data wherein at least two input molecules undergo hybridization to form a template for a primer extension reaction, and the primer extension reaction synthesizes a result strand DNA molecule which represents a result of performing the operation on the input data.

The present invention also provides for a method for performing an operation on input data to arrive at a specific result, comprising the steps of: (1) preparing a plurality of input molecules which represent the input data; (2) combining the input DNA molecules in a composition comprising an enzyme and substrates necessary for a primer extension reaction under reactive conditions; (3) performing the primer extension reaction such that at least two input DNA molecules undergo hybridization to form a template for the primer extension reaction, for a period of time sufficient to produce a result DNA strand complementary to the template, wherein the result strand represents a result of performing the operation on the input data; and (4) reading the information contained in the result strand.

The DNA-based computer of the invention may perform a variety of operations which may be used to solve mathematical or logical problems.

The ability of DNA to encode a massive amount and diversity of information, together with the speed of hybridization of complementary DNA sequences and primer extension reactions, provide the DNA-based computer with the potential capacity to solve extremely complex problems. An extensive array of addition operations may be performed in parallel, for example, and used to provide approximate solutions to integrals at, potentially, a greater speed than modern computers.

For purposes of clarity, and not by way of limitation, the detailed description of the invention is divided into the following subsections, wherein general explanations of the underlying principles of the invention are followed by a series of example sections which illustrate the application of the present invention to the operation of addition:

(i) operations which may be performed;

(ii) preparation of input molecules;

(iii) primer extension reactions; and (iv) reading the result strand.

5.1. OPERATIONS WHICH MAY BE PERFORMED

The present invention may be utilized to perform certain mathematical or logical operations. In particular, but not by way of limitation, it may be used to perform addition and operations that can be expressed as sequences of addition such as subtraction, multiplication, and integration. Accordingly, the present invention may also be used to solve differential equations, because a differential equation may be transformed into an integral equation. Moreover, the present invention may be used to represent any Boolean function and solve a Boolean network.

5.2. PREPARATION OF INPUT MOLECULES

The preparation of input molecules which are to be used to perform a particular operation in the DNA-based computer comprises three steps: first, the identification of characteristics of input data that are to be represented as values and positions in the input molecule; second, the design of an input molecule that represents those values and positions and also provides operator sequences that allow performance of the operation (including position operator and position transfer operator sequences); and third, the synthesis of the desired input molecules.

Those characteristics of input data which are to be represented as values and positions in the input molecule depend upon the nature of the input data and the type of operation which is to be performed.

For example, where two binary numbers 11 and 01 are to be added together, the characteristics to be represented for each number are the integers in the $2^1$ and $2^0$ positions. For the first number, 11, the integer at the $2^1$ position is 1, and the integer at the $2^0$ position is also one. In other words, the values at the $2^1$ and $2^0$ positions are both 1. Input molecules are to be prepared which correspond to both these positions. As explained in greater detail in sections 6 and 7, below, three input molecules may be used to represent the $2^1$ position of the first number, and two input molecules may be used to represent the $2^0$ position of the first number. Each of the input molecules used to represent a particular position contain different operator sequences. Similarly, for the second number 01, two input molecules may be used to represent the 0 at the $2^1$ position, and one input molecule may be used to represent the 1 at the $2^0$ position.

The values at each position may be represented by DNA sequences. The use of DNA sequences to represent value and/or position may vary according to experimental design. For example, completely different DNA sequences may be employed to represent the same value (e.g., 0) at two different positions (e.g., $2^0$ or $2^1$). Alternatively, it may be desirable to subdivide the DNA sequence encoding a number, so that one part of the sequence encodes the value, and another portion encodes the position; in such a system, a specific sequence may always encode a particular digit no matter where it occurs, and a different specific sequence may always encode a particular position. Moreover, a system may be designed such that, in the final result strand, a DNA sequence representing a particular value may be located adjacent to at least one operator element containing position information.

In addition to containing DNA sequences representing values at positions of the input data, input molecules may also be designed to include DNA sequences which function as operator sequences that allow performance of the desired operation (including position operator and position transfer operator sequences). The operation is executed by the hybridization of operator sequences with complementary DNA molecules containing primer sequences which result in primer extension to form a result strand; the rules that determine which members among the population of molecules may hybridize and form primer extension templates depend upon the operation to be executed. The operator sequences may themselves serve as primer sequences (see Sections 6 and 7, below). Thus, a DNA-based computer according to the invention comprises at least one pair of complementary operator sequences.

As used herein, the terms "hybridize" and "hybridization", and derivatives of these terms, refer to the association of complementary DNA sequences to form double-stranded DNA; when two molecules are said to hybridize, however, the hybridization may involve only a region of the molecules involved (preferably at least 3, more preferably at least 10 base pairs and even more preferably at least 15 base pairs) and need not produce a fully double-stranded molecule (i.e., there may exist regions of one or both molecules in the hybridized pair which are not complementary). The term "complementary", as used herein, refers to the ability of two molecules to hybridize under standard conditions; however, it is preferred that DNA sequences intended to be complementary according to the invention be designed to produce base-pairing between at least 95 percent, and preferably all, bases (it being understood that such complementary sequences may be comprised in two larger DNA molecules that are not otherwise complementary).

For example, where the operation is addition of two single digit binary numbers, the first number may be represented by two input molecules which each contain operator sequences that will ensure the production of the correct result strand depending upon the identity of the second number.

In the binary system, there are only two digits, 0 and 1. Thus, the result of addition of two single-digit binary numbers, in the $2^0$ position, can only be 0 or 1. For any given first number, if the second number to be added is 0, the result in the $2^0$ position will be the same as the first number. But if the second number to be added is 1, then the result, in the $2^0$ position, will be different from the first number, so that if the first number is 1, the result in the $2^0$ position will be 0, and if the first number is 0, then the result in the $2^0$ position will be 1. It may be said that if the second number is 1, then the result of addition at the $2^0$ position will be the "opposite" of the first number.

According to the present invention, the foregoing addition operation may be executed by representing the first number with two input molecules, one which represents the same value as the first number, and the other the opposite value. This is accomplished by (1) incorporating into the first alternative input molecule the value (1 or 0) of the first number and a position operator which indicates that this is the same value as the first number; and (2) incorporating into the second alternative molecule the opposite value (0 or 1) and a position operator which indicates that this is the opposite value as the first number. For example, where the first number is 1, it may be represented by two input molecules designated "1-SAME" and "0-OPPOSITE". The input molecule representing the second number may be designed to comprise a position operator which will bind to the SAME-containing molecule if the second number is 0, but will hybridize to the OPPOSITE-containing molecule if the second number is 1. The input molecule representing the second number comprises a primer (which may be part of the position operator) which enables primer extension of the hybridized molecule to produce a unique result strand. By "choosing" the correct input molecule to extend, "molecular bit-flipping" is accomplished.

Where a relationship between positions of input data exists, it may be necessary or desirable to include a position transfer operator in one or more input molecules. For example, there is a relationship between the $2^1$ and $2^0$ positions of a binary number, as both are determinants of the quantity represented by that number. Furthermore, when two binary numbers are added, it may be necessary to "carry the one" from the $2^0$ position to the $2^1$ position. As presented in greater detail below, "carry the one" may be accomplished by including an input molecule which will only be used if a "carry" operation is necessary. For example, if the values at the $2^0$ positions of two binary numbers to be added are both 1, the first number could be represented by two input molecules, one of which would be utilized if the value of the second number at the $2^0$ position is also 1. That input molecule would comprise (1) DNA sequence representing a value of 0 (which is "opposite" to the value of the first number); (2) a position operator designating that value as "opposite", which is complementary to a primer sequence comprised in an input molecule representing the second number; and (3) a position transfer operator which may be incorporated into a result strand formed by primer extension, and which is complementary to an input molecule representing the $2^1$ position, thereby conveying the information to "carry the one".

In the foregoing example, for any specific first number (0 or 1), the result of addition to any potential second number has three alternatives: the sum is either 1, 0, or "0 carry the one". Thus, the first number may be represented by three input molecules reflecting these three possibilities. In operations where the result of an operation on a given first input datum has more than three alternatives, the input data is represented by a greater number of input molecules which reflect the increased variety of possible solutions. For example, if addition is performed in base 3, so that the result of addition has five possible alternatives, namely, 0, 1, 2, and "0 or 1 carry the one", input molecules may be designed appropriately (see Section 9, below) reflecting each of these four possibilities. This concept can be extended to any other base system, including the more commonly utilized base 10. It may also be extended to any other type of computation in which a specific input chosen from a variety of possible inputs leads to a specific output result. For example, but not by way of limitation, this concept may be applied to compound logical operations (See Section 8, below).

Extension of these methods to addition in other bases may be accomplished by either translating those numbers into binary numbers, or by designing the experiment along similar lines to directly operate in those bases. For example, see Section 9, below.

In view of the importance of selective hybridization between molecules, it may be desirable to design the DNA sequences used to represent the various elements of the invention in a manner which avoids unplanned, inappropriate hybridization, such as hairpin formation and primer duplex formation. For example, but not by way of limitation, a computer program such as the OLIGO computer program (Version 4.0, National Biosciences, Inc., Plymouth, Minn.), may be used to design DNA sequences which avoid unwanted cross-hybridization events.

The input molecules of the invention may be prepared using any method known in the art, including chemical as well as molecular biology synthetic techniques.

5.3. PRIMER EXTENSION REACTIONS

The input molecules may then be combined, and primer extensions may be carried out using any primer extension protocol known in the art. Generally stated, the input molecules may be combined in a composition comprising an enzyme and substrates necessary for a primer extension reaction under reactive conditions; the term "reactive conditions" refers to conditions (e.g., buffer, temperature, the presence of deoxynucleoside triphosphates) suitable for the primer extension reaction to occur. The relative amounts of input molecules may be varied according to experimental design. However, it may be preferable to provide the particular operator sequences which are to hybridize in approximately equivalent amounts, or, more preferably, to provide an excess of primer versus template.

In a first embodiment of the invention, referred to hereafter as "Method I", primer extension may be performed using a Taq polymerase (e.g., AmpliTaq, as supplied by Stratagene). However, it may be preferable to employ instead, in Method I, either Vent DNA polymerase (e.g., as supplied by New England Biolabs), or Pfu polymerase (e.g., as supplied by Stratagene), since these enzymes have a lower error (misincorporation) rate than Taq DNA polymerase. As a specific example, and not by way of limitation, for the addition of two single-digit binary numbers, approximately 2–10 pmoles of input molecules which may serve as template strands and 50 pmoles of input molecules comprising sequences which may serve as primers for primer extension may be combined in a reaction mixture, such that, for example, the molar ratio of (a) input molecules representing either the first number or the placeholder strand to (b) input molecules representing the second number is in the range of 1:5 to 1:25. The reaction mixture may further contain 2.5 mM $MgCl_2$, non-radioactive dATP and dTTP (300–1,000 pmoles of each), [$^{32}$P]dCTP and [$^{32}$P]dGTP (each approximately 17 pmoles with a specific activity of approximately 3,000 Ci/mmole) and 2.5 units of AmpliTaq enzyme. Multiple rounds of primer extension may then be performed employing 5–15 cycles of (1) one to two minutes at 95° C.; (2) one to two minutes at 55–66° C.; and (3) two minutes at 72° C.

In a second, preferrred embodiment of the invention, referred to hereafter as "Method II", input molecules comprising a primer DNA sequence may be prepared, employing standard techniques (see, for example, Levenson and Chang, 1990, in "PCR Protocols: A Guide to Methods and Applications" Innis et al., eds., Academic Press, San Diego, p.99), such that a biotin moiety is attached to the 5' end of the primer DNA sequence. Primer extension may then be performed as described in Method I above, except that no radioactive dNTP's would be employed, and approximately 300–1000 pmoles each of non-radioactive dATP, dCTP, dGTP, and dTTP would be present. Following primer extension, each result DNA strand may be expected to contain a single biotin moiety.

In a third embodiment of the invention, referred to hereafter as "Method III", primer extension may be performed as in Method II, but no biotin moiety is attached to the primer DNA sequence. Following primer extension using unlabelled deoxynucleosides, the result DNA strand has therefore not incorporated any labeled dNTP's.

Primer extension of a population of input molecules generates one or a series of result strands. The final result strand may be read to determine the output data. Importantly, however, one or more intermediate result strand may be generated from a subpopulation of input molecules during the performance of an operation. Such intermediate result strands may serve to carry values and operator sequences which interact (via primer extension) with one or more additional subpopulations of input molecules. In certain cases, it may be desirable to perform primer extensions of distinct subpopulations of input molecules in separate reaction vessels.

5.4. READING THE FINAL RESULT STRAND

A variety of protocols for reading the final result strand may be employed, including those listed in this section as well as further protocols which utilize standard laboratory techniques and would be readily apparent to the skilled artisan. The readout protocol employed depends upon the method of primer extension used.

For example, where Method III, as described in the preceding section, is used to effect primer extension, yielding an unlabeled result strand, total DNA may be isolated (e.g., by phenol extraction) and then one or more appropriate primer pairs may be employed in one or more polymerase chain reactions to detect the presence of DNA sequences representing the values at positions of interest in the output data (Ausubel et al, eds., 1992, *Short Protocols In Molecular Biology*, Second Edition, John Wiley and Sons, New York). The primers may, for example, be designed to correspond to regions of operator sequences which flank regions representing values. As a specific nonlimiting example see Rule VII in Section 7 below, where the final result strand of the addition of the binary numbers 11+01 is shown to have the sequence 3'1(2)/OPP(1,2)/0(1)/OPP(1)/OPP(0,1)/0(0)/OPP(0)5', where 1(2), 0(1), and 0(0) are DNA sequences which represent the values 1, 0 and 0 in positions $2^2$, $2^1$ and $2^0$, respectively. This result strand may be read out by PCR employing the primer pair $\{\overline{1}(2), 0(1)\}$ (where overlining indicates complementarity); while this primer pair may be expected to produce a product, other primer pairs corresponding to a "wrong" answer, such as $\{\overline{1}(2), 1(1)\}$ would not be expected to yield a PCR product. Using this approach, it may be shown that the values of the digits in the $2^2$ and $2^1$ positions are, respectively, 1 and 0. An entirely analogous analysis with appropriate sets of primer pairs may be used to reveal that the value of the digit in the $2^0$ position is 0.

As a second example of a readout protocol, the final result strand may be "queried" by hybridization with appropriate complementary oligomers. In this approach, a DNA probe, designed to be complementary to a particular value (the "test value"), may be evaluated for its ability to hybridize to the final result strand. A positive hybridization result would indicate that the test value is represented in the final result strand. This could be performed by an adaptation of the "reverse dot blot" hybridization technique (see, for example, Kawasaki and Chehab, 1994, in *Methods in Molecular Biology* Vol. 28, "Protocols for Nucleic Acid Analysis by Nonradioactive Probe", Isaac, ed., Human Press Inc., Totowa, N.J.; Chapter 33.; and Kawasaki et al., 1993, Methods in Enzymology 218: 369–381). The complementary oligomers may first be immobilized in a form available for hybridization. One way to accomplish this would be to synthesize each complementary oligomer with an amino group at the 5' terminus, thereby permitting covalent attachment of the probe, via the 5' terminus, to a membrane (e.g., Biodyne C from Pall Biosupport, Glencove, N.Y.) having a derivatized surface containing a high density of anionic carboxyl groups, while permitting the complementary oligomer sequence to be available for hybridization. Numerous other means of covalent attachment of complementary oligomers to a membrane or other solid support may be employed, which may also permit the complementary oligomer to be available for hybridization; e.g., probe attachment through Poly(dT) tails (see Kawasaki et al., 1993, Methods in Enzymology 218: 369–381).

Each complementary oligomer may first be attached through a separate hole in a multi-well microfiltration manifold to a spot on a membrane. The next steps would depend upon which of the primer extension reactions set forth in Section 5.3 had been employed. If Method I had been employed, the next steps would be (1) isolation by, e.g., phenol extraction, of total DNA from the reaction mixture in which primer extension had been performed; (2) hybridization of the $^{32}$P-labeled result strand to the filter containing immobilized probes; (3) washing; and (4) autoradiography, using standard techniques (see, e.g., Ausubel et al., eds., 1992, *Short Protocols in Molecular Biology*, Second Edition, John Wiley & Sons, N.Y., Unit 2.9). If Method II has been employed, the next steps would be (1) isolation by, e.g., phenol extraction, of total DNA from the reaction mixture in which primer extension had been performed; (2) hybridization of the biotin-labeled result strand to the filter containing immobilized probes, as just described; and (3) use of the non-radioactive streptavidin-horseradish peroxidase detection method described in Kawasaki et al., 1993, Methods in Enzymology 218: 369–381 (especially see FIG. 1 of that reference). For use of the horseradish peroxidase reaction, appropriate substrates yielding either a colored product or light (via enhanced chemiluminescence) may be employed in the detection procedure.

It may be noted that, in either of the above hybridization methods for reading the result strands produced by primer extension Method I or II, it is possible that the templates employed for primer extension may compete with the probes for hybridization to the result strand, thus interferring with or preventing the ability to read the values encoded in the result strand. If this proves to be the case, it may prove desirable to first isolate the result strand away from all input DNA molecules, prior to performing the readout procedure. For result strands labeled according to Method I above, this separation may be performed as follows. All input DNA strands may be synthesized with a biotin moiety at the 5' end. Following primer extension, all double-stranded DNA regions may be denatured (e.g., by boiling for 5 minutes), and all input DNA strands may then be removed from solution by binding to streptavidin-coated beads followed by centrifugation, or the use of magnets. Detection may then be carried out employing the supernatant, which may be expected to contain only or primarily result strands. It may be noted further that the complementary oligomer corresponding to the "wrong" answer at a given position may sometimes yield a small, non-specific background signal. If this should prove a problem in the readout of a result, adjustment of the stringency of the hybridization conditions may be expected to yield conditions where the signal-to-noise ratio is sufficiently large to permit unequivocal determination of the right answer at each position of the result DNA strand.

In a third example of a readout protocol, the final result strand may be "queried" by restriction enzyme digestion. According to such a protocol, the input molecules may be designed so that an element encoding a particular value and position may be represented by a DNA sequence which contains a unique restriction site. For example, where binary numbers are being added, the particular DNA sequences representing the values 0 or 1 at the $2^1$ position (also referred to herein as "value/position elements") may contain, respectively, Not1 and Xho1 restriction enzyme cleavage sites. Since restriction enzymes cut only double-stranded DNA, the appropriate reaction (e.g., primer extension) may first be employed to convert the single-stranded final result strand into double-stranded DNA. Then, if the double-stranded result strand was cut by, respectively, Not1 or Xho1, this would identify the value at position $2^1$ as, respectively, 0 or 1. Since many highly sequence-specific restriction enzymes are available (Ausubel et al., eds, 1992,

*Short Protocols In Molecular Biology*, Second Edition, John Wiley and Sons, New York, Unit 3.1), this protocol may readily be applied to read complex final result strands. As discussed above, the success of this approach may require prior separation of the result strand from input DNA, which may be accomplished, for example, by biotinylation of input DNA, and, following denaturation of double-stranded DNA, the use of streptavidin-coated beads to remove input DNA via the biotin-avidin interaction.

In a fourth protocol, the final result strand, appropriately labeled, may be read by determining the sequence of the result strand. A procedure of this type may not require prior separation of the result strand from input DNA strands.

In a fifth protocol, the final result strand may be read by the identification of uncut DNA molecules or restriction fragments of particular sizes. This protocol may, in practical terms, be more suitably applied in relatively simple operations or in operations where a relatively small number of value/position elements need be recognized. For example, where it is desirable to determine whether one or a few value/position elements are present in the result strand, the DNA encoding these elements may be designed so that they are flanked by specific restriction enzyme cleavage sites and have a size which substantially differs from other value/position elements which may be present in the final result strand.

6. EXAMPLE: ADDITION OF TWO SINGLE-DIGIT BINARY NUMBERS

In this example section, the binary system is employed to represent numbers. The addition problems to be considered first are: 0+0=0, 0+1=1, 1+0=1, and 1+1=10. These examples suffice to illustrate three basic principles of addition, as follows. First, the examples, 0+0=0 and 0+1=1 illustrate the principle that a number is unchanged by addition of zero. Second, the examples, 0+1=1 and 1+0=1, illustrate the commutativity of addition; i.e., that m+n=n+m. Third, the example, 1+1=10 illustrates the concept that addition of two non-zero numbers should yield a different result than addition of 0 to a number.

Each DNA sequence described in this section as serving a particular function exists in the form of a single-stranded DNA molecule, and is different from the sequences of all other DNA sequences employed to serve other functions. Each DNA sequence is also non-complementary to all other sequences, except for DNA sequences designated by an overlined symbol, e.g., $\overline{P(DEF)}$, representing the sequence complementary to the sequence represented by P(DEF). Because of the sequence requirements for specific hybridization of two DNA strands, the information content of a DNA sequence and its complement are identical herein. The following rules for adding two digits are applied:

Rule 1. Representation of the First Number. The first number is represented by the following two input molecules:

The first strand, called the defining (DEF) strand, contains at its 5' terminus a sequence representing the value of the first number (either 0 or 1), followed by a position operator sequence termed $\overline{P(DEF)}$, where P stands for primer (see below).

The second strand, called the opposite (OPP) strand, contains a sequence representing the opposite value of the first number (i.e., either 1 or 0), followed by a position operator sequence termed $\overline{P(OPP)}$. If the first number is 1, the opposite strand additionally contains at its 5' terminus a position transfer operator sequence designated $\overline{PP}$ (the full significance of which will become apparent under Rule 1a below).

As an example, where the first number is 0, it may be represented by the following two DNA strands:

Defining strand: 5'$\overline{0}$/$\overline{P(DEF)}$3'

Opposite strand: 5'$\overline{1}$/$\overline{P(OPP)}$3'.

Rule 2. Representation of the Second Number. The second number is represented by a single DNA strand containing a position operator sequence that is either P(DEF) if the second number is 0, or P(OPP) if the second number is 1. This position operator may serve as a primer in a primer extension reaction to direct the extension of the appropriate input molecule representing the first number, thereby generating the result of the addition operation. The primers are thus designed such that, if the second number is 0, the defining strand input molecule representing the first number will be operated upon (e.g., serve as a template for primer extension), while if the second number is 1, the opposite strand input molecule representing the first number will be operated upon (and a position transfer operator will be created in the result strand if it is necessary to "carry the one").

Rule 3. Performance of the Addition Operation. The process of addition is carried out by combining the two numbers, represented by DNA as described above, in a test tube containing the reagents required for primer extension plus radioactively labeled deoxynucleoside triphosphates, followed by incubation under appropriate conditions of temperature and time for a primer extension reaction.

Rule 4. Readout of the Result of the Addition Operation. Following the primer extension reaction in Rule 3 above, the result of the addition operation is read out by size analysis (e.g., gel electrophoresis followed by autoradiography).

Reactions which may be used to apply these rules to the four simple addition problems described above are illustrated schematically in FIG. 1A, in which the number 1 is represented by a 50-base long DNA sequence, and all other elements are represented by 20 base-long DNA sequences. In each of the first two examples (0+0 and 0+1), the first number 0 is represented by two DNA strands according to Rule 1 above. To carry out the operation 0+0, the 20 base operator P(DEF) is added to the test tube, and hybridizes specifically to the 40 base-long defining strand 5'$\overline{0}$/$\overline{P(DEF)}$3'. The subsequent primer extension reaction then results in extension of the P(DEF) primer to yield the 40 base-long result strand 3'0/P(DEF)5'. Thus, the operation 0+0 yields a result strand the same size as the strand representing 0 in the first input number, illustrating the principle that a number is unchanged by the addition of zero.

The operation 0+1 may be performed in an analogous fashion, except that the operator P(OPP), corresponding to a value of 1 for the second number, is added to the test tube, and hybridizes to the 70 base-long opposite strand of the first number. Primer extension then yields the 70 base-long result strand 3'1/P(OPP)5'. Thus, the operation 0+1 yields a result strand of the same size as the strand representing 1 in the first input number, illustrating the principle that a number is unchanged by the addition of zero.

Application of the above rules to the operation 1+0 yields a result strand of the same size as is yielded by the operation 0+1, as required by the rule of commutativity of addition. Finally, the operation 1+1 yields the 60 base-long result strand 3'PP/0/P(OPP)5'. It is seen that this result strand has a different size than the result strands of any of the three previous operations. The outcome of the 1+1 operation, 10, can thus in principle be unequivocally identified by the size of its result strand, as required by the principle that addition of two non-zero numbers yields a result which is different from the addition of 0 to a number.

As discussed above, it is necessary to be able to "carry the one"; i.e., to perform the "ripple-carry addition algorithm" (Ado et al., 1992, *Foundations Of Computer Science*, W. H. Freeman, New York), in which a 0 is "written" in the $2^n$ position, and a 1 is "carried" to the $2^{n+1}$ position. Of the four possible single-digit addition operations that can occur at the $2^0$ position, only 1+1 would require transfer of information (i.e., "carrying the 1") to the $2^1$ position to yield the resulting binary number (=10). To permit this transfer of information, we further define the PP sequence introduced earlier, and also define two new DNA sequences, as follows: 1. the PP sequence is now defined as a potential primer (operator); 2. a "placeholder" DNA strand is created to represent the operation "carry the one to the $2^1$ position"; and 3. A junk DNA element (J) is employed to ensure that only the result strand (and thus not the template) will undergo extension. The DNA strands for the add ition alg orithm are the n constructed such that, as before, the PP will be uniquely incorporated into the result strand by the operation 1+1 at the $2^0$ position. However, in the presence of the placeholder strand, a second reaction will occur, in which the PP element employs the placeholder strand as a template to prime addition to the result strand of the value 1 at the $2^1$ position. These considerations lead to the following modification of Rule 1 (all other rules remain unchanged).

Rule 1a. Representation of the first number if its value is 1. As in Rule 1, if the value of the first number is 1, its opposite strand carries at its 5' terminus a sequence designated PP. In addition, an input molecule, the "placeholder strand" for the $2^1$ position, with the sequence 5'$\overline{1/PP}$/J3', is added to the reaction. This strand will serve as a template for primer extension only if the result strand of the first reaction contains the PP element at its 3' terminus, which will occur only during the operation 1+1.

The role of the placeholder strand in performance of the ripple-carry addition algorithm in the operation 1+1 is illustrated in FIG. 1. The first primer extension reaction is, as before, the 1+1 reaction illustrated in FIG. 1A., and yields the first result DNA strand 3'PP/0/P(OPP)5'. It may be noted that this reaction generates the potential primer (PP) described above. However, as illustrated in FIG. 1B, a second reaction then occurs, in which the placeholder strand functions as a template for further extension of this first result strand, with the J sequence preventing extension of the placeholder strand. The second (and final) result strand has the 110 base-long sequence 3'1/PP/0/P(OPP)5'. It is esthetically pleasing that this result strand is larger than the 70 base-long result strands for the operations 1+0 or 0+1. More significantly, use of the placeholder strand for the operation 1+1 has yielded a final result strand in which the 0 has been written in the $2^0$ position, and a 1 has been carried to the $2^1$ position. Thus the placeholder strand transfers information from the $2^0$ to the $2^1$ position, and as a result the outcome of the addition operation, 10, is now directly encoded by the final result strand. As set forth in Section 5.4, above, a number of protocols may be employed to read out a result strand of this type. At this point, it is sufficient to note that the result of this addition operation can be read out by the procedure described in Rule 4, since the result strand can be uniquely identified on a gel because of its large size (110 bases). It may be noted that the first and second reaction together represent the simplest example of a process we term a "horizontal chain reaction", in which input DNA sequences serve as successive templates for extension of a result DNA strand.

To apply experimentally the theoretical algorithm developed above, DNA oligomers containing the elements illustrated in FIG. 1 were synthesized and employed to carry out the four simplest addition problems according to Rules 1a and 2–4 above. In particular, the following experiments were performed.

The OLIGO computer program (Version 4.0, National Biosciences, Inc., Plymouth, Minn.) was employed to design DNA sequences that would avoid problems arising from inappropriate hybridization, such as hairpin formation and primer duplex formation. The elements illustrated in FIG. 1 were represented by the following sequences (all listed 5' to 3'): $\overline{0}$, CCTTACCCCTTTCTACCTCT; (SEQ ID NO:1); P(Def), TCGTCTCAGGGGGGGTGCTT; (SEQ ID NO:2); $\overline{1}$, CACGAAACGAGCGAAAGCACCCACAACAAGAACCACACAGCACAACCAGA; (SEQ ID NO:3); $\overline{P(Opp)}$, GACCAAATACAGGCTAACAT; (SEQ ID NO:4); $\overline{PP}$, CATTCCCCTTCCTCTCCTCC; J, TCTCC (SEQ ID NO:5); J, TCTCC (SEQ ID NO:6) J, TCTCC(SEQ ID NO:6). Elements complementary to those shown here each contained the appropriate complementary DNA sequence. Each of the indicated primer extension reactions in panel A was then performed separately by combining in a final volume of 30 μl: AmpliTaq buffer (Perkin Elmer) containing 2.5 mM MgCl$_2$, dATP (5 nanomoles), dTTP (5 nanomoles), [$^{32}$P]dCTP and [$^{32}$P]dGTP (each 17 picomoles at a specific activity of 3,000 Ci/mmole), 2.5 units AmpliTaq, 50 ng each of the two DNA strands representing the first number plus 5 μg of the strand representing the second number. Primer extension was then performed employing 15 cycles each of one min at 95°, one min at 58° (except for 0+1, where 66° was employed), and 20 sec at 72°. For all the primer extension reactions indicated in panel B except 1+1, the above protocol was employed, except [$^{32}$P]dCTP plus the other three cold dNTP's were present. The first 1+1 reaction (illustrated in FIG. 1A) was also as above, except that only dATP, dTTP, and dGTP were present (note that the extended sequence should contain no C's). Following this reaction, 3 μl of the reaction were combined with 5 μg of the 5'$\overline{1/PP}$/J3' DNA strand illustrated in FIG. 1B, brought to 30 μl with AmpliTaq buffer containing 2.5 mM MgCl$_2$, dATP, dTTP, dGTP, [$^{32}$P]dCTP, and 2.5 units AmpliTaq, and subjected to a primer extension reaction as described above. For the reactions shown in both panels A and B, aliquots of each reaction mixture were then denatured and analyzed by standard denaturing gel electrophoresis as described (Sambrook, et al., 1989, *Molecular Cloning*, Second Edition, Cold Spring Harbor Laboratory, Cold Spring Harbor, p. 13.45), except that the sample buffer additionally contained 10 mM NaOH. The following denatured (thus single-stranded) [$^{32}$P]-labeled molecular weight markers were employed: Panel A, MspI-digested plasmid pBR322; Panel B, strands $\overline{PP/0/P}$(OPP) and $\overline{1/P}$(DEF) in FIG. 1A (respectively 60 and 70 bases) plus oligomers of the 41 base-long 1P element (Yan, et al., 1991, Mol. Endocrinol. 5: 535). Differences in the efficiencies of individual primer extension reactions were corrected for by applying aliquots containing approximately equal amounts of product. Following electrophoresis, the gel was fixed and dried, autoradiographed, and imaged using the Image-Quant 3.3 program on a Molecular Dynamics Phosphor-Imager.

The results shown in FIG. 2A demonstrate that the 0+0 operation produced the expected 40 base-long result strand, while the operations 0+1 and 1+0 each generated the expected 70 base-long result strand, thus satisfying biochemically the required commutativity of addition. As illustrated in FIG. 2B, similar results for the latter two operations were obtained in a separate reaction, although in this case, the 1+0 result strand migrated slightly faster than predicted.

FIG. 2B also shows that the operation 1+1 yielded the expected 110-base long result strand, demonstrating that both of the successive reactions illustrated in FIGS. 1A and 1B for this operation had occurred. These results thus demonstrate that the theoretical addition algorithm depicted in FIG. 1 can be executed biochemically. Of particular interest for the following considerations, the successful performance of the 1+1 operation demonstrates experimentally that a placeholder DNA strand can be employed to extend a simple single-digit DNA algorithm to one in which a second binary digit is incorporated into the calculation.

7. EXAMPLE: ADDITION OF TWO TWO-DIGIT BINARY NUMBERS

This example section relates to methods which employ DNA to add any two binary numbers. In general, when adding two numbers, each number having digits (i.e., values) at positions designated "i" and "i–1" where digit i of the first number is combined with digit i of the second number, there are three possible scenarios, as follows. First, the operation at position (i–1) may not result in the "carry the one" to position i. This scenario is said to "carry the zero". Second, the operation at position (i–1) may result in a "carry the one" to position i, but at least one input digit at position i is 0. This results in at most two 1's at position i, so a "carry the one" to position i+1 may or may not be required. Third, the operation at position (i–1) may result in a "carry the one" to position i, and both of the input digits at position i are 1. This results in three 1's at position i, thereby requiring a "carry the one" to position i+1.

This section defines a set of explicit rules for representing and adding two two-digit binary numbers, and for reading out the result. The extension of these rules to the case of addition of any two n-digit binary numbers is set forth in Rule VIII, hereunder. Further, as a specific example, the operation 11+01=100 is described.

A representation of all possible pairs of input two-digit numbers is shown in FIG. 3. The "first digit" and "second digit" at a given $2^n$ position refer to the value (either 0 or 1) at that position of, respectively, the first and second numbers to be added. It is seen that representation of a given digit requires either 1, 2, or 3 strands of DNA, whose functions are described below. As before, each of the indicated elements is represented by a unique DNA sequence; and each DNA sequence is non-complementary to all other sequences, except that an overlined element indicates a DNA sequence that is complementary to the sequence representing the element [e.g., $\overline{DEF}(0,1)$ is complementary to DEF(0,1) and $\overline{1}(0)$ is complementary to 1(0)]. The representation of digits employs the following convention: a number in parentheses refers to a position, while a number not in parentheses refers to the value of the digit at that position. For example, 0(1) indicates a value 0 at the $2^1$ position of a binary number. The rules for the representation of two two-digit numbers are described in FIG. 3 and Rules I–V, and the rules for adding these numbers and reading out the results are described in Rules VI and VII, respectively.

Rule I. Representation of the first digit at the $2^0$ position. This digit is represented by two input molecules of DNA each containing the following three elements (all descriptions of the elements in a given DNA strand begin with the 5' end of the strand): a position transfer operator (eg, $\overline{DEF}(0,1)$, which transfers information from the $2^0$ to the $2^1$ position), an element representing the value of the digit at the $2^0$ position, and a position operator (e.g., $\overline{DEF}(0)$, which is employed only at the $2^0$ position).

Rule II. Representation of the second digit at the $2^0$ position. The second digit is represented by a single input molecule with a sequence which is either P(DEF) if the second digit is 0, or P(OPP) if the second digit is 1, and serves an operator (primer) function, where primer extension yields a result strand.

Rule III. Representation of the second digit at the $2^1$ position. This digit is represented by two input molecules, each containing three elements: a position operator (note the requirement for three different operators: DEF and OPP as before plus a third termed CAR ("Carrier")), a position transfer operator, and a J (junk) element serving the same function as the J element in Rule 1a of Section 6 above. This representation is designed so that only one of the strands representing this digit may hybridize with the result strand described in Rule II, and then serve as a primer extension template for further elongation of the result strand. It is seen that if a 0 or 1 were carried from the reaction at the $2^0$ position, then the template employed for primer extension would be, respectively, the first or second strand of this digit (see FIG. 3). Thus the roles of the position transfer operators in the $2^0$ position first digit and the $2^1$ position second digit are, respectively, to send information to the $2^1$ position, and to receive this information.

Rule IV. Representation of the first digit at the $2^1$ position. This digit is represented by three input molecules, each containing the indicated four elements, with each element defined as described above. It is seen that only one of these strands will hybridize with the result strand described in Rule III, and serve as a primer extension template for further elongation of the result strand. The choice of strand to be employed as a template in this reaction may be seen to satisfy the following conditions: If the reaction at the $2^0$ position brought 0 to the $2^1$ position and the value of the second digit at the $2^1$ position is a 0 or 1, then the template is, respectively, the appropriate first or second strand (FIG. 3). However, if the $2^0$ reaction brought 1 to the $2^1$ position and the value of the second digit at the $2^0$ position is also a 1, then the template is the third strand representing the value 1 (FIG. 3), and in addition a 1 must be "carried" to the $2^2$ position employing the placeholder described in the following rule. It may be seen that the latter operations are analogous to the "bit flipping" or "flipping the on-off switch" employed in electronic computers for binary addition.

Rule V. Representation of a placeholder for the $2^2$ position. To permit a 1 to be carried to the $2^2$ position if the result of the addition operation under the above rules require it, the placeholder strand illustrated in FIG. 3 is included. This placeholder will function only under the last condition described in Rule IV above, where it will serve as a template to further extend the result DNA strand to carry a 1 to the $2^2$ position.

Rule VI. Performance of the Addition Operation. The addition operation is carried out by combining in a test tube the DNA strands required for representation of the two numbers, the placeholder strand, and primer extension reagents, followed by incubation under appropriate conditions of temperature and time for a primer extension reaction.

Rule VII. Readout of the Result of the Addition Operation. The final result strand will directly encode the result of the addition operation (see, e.g., the sample addition operation illustrated in FIG. 4). Thus, the DNA sequence representing each digit of the answer will not only appear in the final result strand in the proper order relative to the other digits, but each such sequence will actually encode both the value of a result digit (i.e., either 0 or 1) and the position in the result (i.e., $2^0$, $2^1$, etc.) in which the digit appears. This feature permits the use of a number of different protocols for reading out the answer, such as the five protocols described in greater detail in Section 5.4, above, which read the result strand by way of (i) amplification by PCR reaction using primer pairs; (ii) hybridization with complementary oligomers; (iii) identification of specific restriction sites; (iv) determination of nucleic acid sequence; and/or (v) identification of distinctive DNA fragment sizes. In the present case of addition of two two-digit numbers, using a PCR- amplification protocol to read the result strand, at most two PCR reactions with appropriate primer pairs would be expected to yield the answer. For example, it will be seen below that the final result strand of the addition of the binary numbers 11+01 would have the sequence 3'1(2)/OPP(1,2)/0(1)/OPP(1)/OPP(0,1)/0(0)/OPP(0)5'. This result strand could be read out by PCR as follows. PCR employing the primer pair $\{\overline{1}(2), 0(1)\}$ should yield a product, whereas other primer pairs corresponding to a "wrong" answer, such as $\{\overline{1}(2), 1(1)\}$ should not yield a PCR product, showing that the values of the digits in the $2^2$ and $2^1$ positions are, respectively, 1 and 0. An entirely analogous analysis with appropriate sets of primer pairs would reveal that the value of the digit in the $2^0$ position is 0. It may be noted that this procedure is expected to yield the correct result in the test tube employed to perform the above reactions, even though this test tube contains numerous species of DNA strands in addition to the final result DNA strand. This is because each input DNA strand contains at most one element encoding a digit, and would thus not be amplified by the PCR primers employed, while all result strands (both intermediate and final) encode either an incomplete result which would again yield no PCR product, or the correct result at both positions to be read out.

Rule VIII. Generalization of the above rules to the addition of two positive rational n-digit binary numbers. The procedure for adding any two binary numbers, each either a positive integer or zero, is described first. First note that, if one number is smaller than the other, zeroes are added to the left of the smaller integer so that both numbers are represented by the same number (n) of digits (as in the example below of 11+01). In addition, if the PCR technique described in Rule VII above is to be employed to read out the result of adding two single-digit numbers, a zero should be added to the left of any such number. The two digits in the $2^0$ position are represented as in FIG. 3. The two digits in each of the positions $2^1$ through $2^n$ are represented as shown for the $2^1$ position in FIG. 3, with the following modification. At a position i other than 1, novel DNA sequences are employed to represent the values 0(i) and 1(i), and operators are replaced appropriately; e.g., $\overline{DEF}(1)$ and $\overline{DEF}(1,2)$ by DNA sequences representing $\overline{DEF}(i)$ and $\overline{DEF}(i, i+1)$. Finally, a placeholder DNA strand with the sequence 5'$\overline{1}$(n+1)/OPP(n, n+1)/J3' is included. The addition operation is in theory exactly as described in Rule VI, and would be expected to yield a final result DNA strand that encodes, in the proper order, the digits representing the answer. It may be noted, however, that addition of two large numbers may require some technical modifications of the addition algorithm. For example, cumulative effects of inefficiencies in each of the multiple successive primer extension reactions involved may necessitate that, at some step, the growing result DNA strand be isolated and amplified by PCR, and the reaction then continued in a new test tube(s) containing components required for the remaining steps in the algorithm. Finally, the readout operation may be performed by one of the procedures described in Rule VII and Section 5.4, above. If PCR with appropriate primer pairs is employed to read out successive pairs of digits, approximately $2^n$ such reactions are estimated to be required to read out the answer.

The foregoing rules may be generalized to adding any two binary decimal fractions, with the following modifications: If one of two numbers to be added has more numbers to the right of the decimal point than the other, add zeroes to the end of the second number so that both numbers are represented by the same number of digits to the right of the decimal point. Let m equal the number of digits to the right of the decimal point in each number, and, as before, let n equal the number of digits to the left of the decimal point in each number. The two digits in the $2^{-m}$ position are represented as shown in FIG. 3 for the two digits in the $2^0$ position. The two digits in each of the positions $2^{-(m-1)}$ through 2n are represented as shown for the $2^1$ position in FIG. 3, with the following modification. At a position i other than −(m−1), novel DNA sequences are employed to represent the values 0(i) and 1(i), and operators are replaced appropriately; e.g., $\overline{DEF}(1)$ and $\overline{DEF}(1,2)$ by DNA sequences representing $\overline{DEF}(i)$ and $\overline{DEF}(i, i+1)$. Finally, a placeholder DNA strand with the sequence 5'$\overline{1}$(n+1)/$\overline{OPP}$(n, n+1)/J3' is included. The addition operation is in theory exactly as described in Rule VI, and will yield a final result DNA strand that encodes, in the proper order, the digits representing the answer. It may be noted, however, that addition of two large numbers may require some technical modifications of the addition algorithm. For example, cumulative effects of inefficiencies in each of the multiple successive primer extension reactions involved may necessitate that, at some step, the growing result DNA strand be isolated and amplified by PCR, and the reaction then continued in a new test tube(s) containing components required for the remaining steps in the algorithm. Finally, the readout operation may be performed by one of the procedures described in Rule VII and Section 5.4, above. If PCR with appropriate primer pairs is employed to read out successive pairs of digits, approximately $2^n$ such reactions are estimated to be required to read out the answer.

An example of the application of these addition rules is shown in FIG. 4, which illustrates the addition of the binary numbers 11 and 01. The input DNA's for each of the four reactions represent, in order: the first and second input $2^0$ digits (each=1); the $2^{nd}$ digit at the $2^1$ position (0); the $1^{st}$ digit at the $2^1$ position (1); and the placeholder strand. In reaction 1, the operator (primer) representing the $2^{nd}$ digit at the $2^0$ position initiates a horizontal chain reaction by hybridizing to the appropriate strand representing the $1^{st}$ digit at the $2^0$ position and, upon primer extension, yields Result Strand 1 (RS1), which is seen to encode a 0 at the $2^0$ position. In reaction 2, RS1 primes the appropriate strand of the $2^{nd}$ digit at the $2^1$ position. Following extension of the primer but not of the template (because of the presence of the J strand on the input DNA strands), RS1 is extended to yield RS2. In reaction 3, RS2 primes the appropriate strand of the $1^{st}$ digit at the $2^1$ position, resulting in extension of RS2 to yield RS3, which now additionally encodes a 0 at the $2^1$ position. Finally, in reaction 4, RS3 primes the placeholder strand for the $2^2$ position, resulting in extension of RS3 to yield the final result strand. It is seen that this final result strand encodes a series of three digits, interspersed with operator sequences, that represent precisely and in the correct order the outcome of this addition operation: 100.

There are some aspects of the algorithm described herein that deserve additional comment. Note the special role of the operator corresponding to the $2^{nd}$ digit at the $2^0$ position. If a primer extension reaction were attempted in a test tube containing all required components except this operator, no such reaction would be expected to occur. This operator can thus be envisaged as catalyzing a horizontal chain reaction, involving multiple sequential reactions that ultimately yield the final result strand. It is also interesting to note that the amount of DNA required to practice this invention does not increase exponentially with the number of digits n in each of the two numbers to be added, but is only a linear function of n. It can be seen from Rules I through V and FIG. 3 that, for large n, where the end effects of the $2^0$ position and the placeholder strand can be ignored, representation of each of the two n-digit numbers to be added requires 2.5 n DNA strands. The experimental performance of the DNA computer described herein is also not technically demanding, since the simple biochemical procedures involved (primer extension, readout by PCR or hybridization or restriction enzyme digestion or determination of the sequence of the result strand, and possibly gel analysis) generally require only a few days of laboratory work. Finally, a striking aspect of this invention is the production in each reaction of a successively elongated result strand that serves a dual function in the addition operation. One function of the result strand is to record, in the proper order, the result of each reaction in the operation. In this sense, the growing result strand is analogous to a passive tape upon which the outcome of successive operations is written, yielding finally an output tape that encodes the result of the addition operation. However, the growing result strand is also an active participant in the addition algorithm, since the output result strand for each operation (reaction) serves as the operator (primer) for the succeeding operation. Thus the result DNA strand is seen to serve both as an operator that transfers information during the addition algorithm, and as a tape that records the outcome.

8. EXAMPLE: PERFORMING LOGICAL OPERATIONS

The properties of logical operations and their relationship to both mathematical operations and computer design are described in considerable detail in Ado et al., 1992, *Foundations Of Computer Science*, W. H. Freeman, New York. Briefly, a logical expression can be taken to be analogous to an electronic circuit, in which the logical operators in the expression represent gates in the circuit. Since logical operations are similar but not identical to mathematical operations, the methods discussed above for using DNA molecules to solve addition problems may be modified to perform logical operations. The following methods may be implemented to perform the logical operations AND, OR, and NOT.

A Boolean function such as AND, OR, or NOT may be expressed as a "truth table", listing the outputs of all possible inputs. The truth tables for these three functions are shown in FIG. 5, from Section 12.4 of Ado et al, 1992, *Foundations Of Computer Science*, W. H. Freeman, New York. It may be seen that a truth table defines a set of binary operations, similar to the operations involved in the DNA-based addition examples set forth above. The function OR may be used as an example, since entirely analogous procedures may be employed for the design of DNA-based computers for performing the other two functions. A DNA-based computer for performing the logical function OR may employ the principles involved in the method of the invention, as applied to addition, to represent, as input DNA molecules, all possible inputs of such a truth table, plus the operators that, upon primer extension with the appropriate input strand(s), as template(s), will output the appropriate result DNA strands.

The adaptation of the DNA-based addition examples set forth above to the performance of the OR operation is illustrated in FIG. 6, which illustrates how DNA may be used to perform the Boolean function OR. Reference should be made to the above truth table for OR, set forth in FIG. 5. Construction of DNA molecules, performance of primer extension reactions, and readout of the result may be performed as described in Section 6 above.

In FIG. 6A, the first column represents the input values of, respectively, p and q. Thus, 0,1 corresponds to p=0, q=1. The second column illustrates the two strands of DNA which may be employed to represent p, and the third column illustrates the strand of DNA which may be employed to represent q. For the first three pairs of values of p,q, the result strands shown in the last column represent exactly the values of the function p OR q. The fourth reaction shown causes the second reaction shown in FIG. 6B, and is expected to yield the result strand shown in FIG. 6B. The rules for interpreting the final result strands of this operation are as follows: If the result strand does not contain a one, the result of the OR operation is zero. If the result strand does contain a one, the result of the OR operation is one. It may be seen that the results of the operations depicted in FIG. 6 agree with the truth table for OR shown in FIG. 5 above: only the first line in the truth table in FIG. 5 does not produce a one, and only the result strand of the first reaction shown in FIG. 6 does not contain a 1.

Such DNA-based computer systems for AND, OR, and NOT may be used to perform "compound" Boolean functions such as, for example, but not by way of limitation, the function of EQUIVALENCE. The Equivalence Circuit shown in FIG. 13.2 of Ado et al., 1992, *Foundations Of Computer Science*, W. H. Freeman, New York, as contained in FIG. 7, illustrates the simplest combination of the fundamental functions AND, OR, and NOT that can perform the EQUIVALENCE function. In that Circuit, the Equivalence function is performed by using a combination of five "gates", each consisting of one of the fundamental functions. As with simpler logical operations, this type of circuit yields a single output. By analogy with the method used to solve addition problems, set forth above, this output may be encoded in a single result DNA strand. An analogous approach may be used to design circuits for performing other "compound" Boolean functions such as, e.g., IMPLICATION and NOR.

Alternatively, an operation such as Equivalence can itself be represented by a simple truth table. For EQUIVALENCE (represented by ≡), this table is as follows: for p and q both=either 0 or 1, p≡q=1. For p=1, q=0 or the converse, p≡q=0. Input molecules may be designed to represent all possible inputs of such a truth table, and to comprise operators that, upon primer extension with the appropriate input strand(s) as template(s), may output the appropriate result DNA strands. A similar approach may be applied to solve other Boolean functions such as Implication and NOR.

9. EXAMPLE: ADDITION OF TWO SINGLE DIGIT NUMBERS PRESENTED IN A BASE OTHER THAN BASE 2

The method presented in Section 7 for adding two binary numbers in base 2 can readily be extended to numbers represented in any base system. As an example, the method may be extended to the addition of two single digit numbers expressed in base 3. A representation in base 3 of all possible pairs of input one digit numbers is shown in FIG. 8. The addition algorithm described in Examples 6 and 7, modified as illustrated in FIG. 8, may be used to correctly add any two one digit numbers expressed in base 3. The extension from base 2 to base 3 may be applied to any pair of input single digit numbers in any base n, as follows. The representation of the first digit in base n requires n DNA strands, while the representation of the second digit may generally require only one strand, corresponding to the particular value of the input digit. This method may be further extended to add any two positive rational n-digit numbers expressed in any base.

Various publications are cited herein, the disclosures of which are hereby incorporated by reference in their entireties.

What is claimed is:

1. A method of performing an operation on input data in a DNA-based computer to arrive at a specific result, comprising the steps of:

(1) preparing a plurality of input DNA molecules which represent the input data;

(2) combining the input DNA molecules in a composition comprising enzymes and substrates necessary for a primer extension reaction under reactive conditions;

(3) performing the primer extension reaction such that at least two input DNA molecules undergo hybridization to form a template for the primer extension reaction, for a period of time sufficient to produce a result DNA strand complementary to the template, wherein the result strand represents a result of performing the operation on the input DNA; and (4) reading the information contained in the result strand; wherein at least one input molecule, having a 3' and a 5' terminus, comprises a junk DNA element at its 3' terminus, such that the 3' terminus of the input molecule cannot serve as a primer in a primer extension reaction in the DNA-based computer.

2. The method of claim 1, wherein a characteristic of the input data is represented in an input molecule by a DNA sequence representing a value at a position of the input data.

3. The method of claim 2, wherein the hybridization of in-out molecules occurs via hybridization of at least one pair of operator sequences comprised in the input molecules.

4. The method of claim 3, wherein the pair of operator sequences are position operator sequences, and wherein the hybridization of the position operator sequences forms a template for a primer extension reaction which generates a result strand DNA molecule which represents the result of the operation on values of input data at a particular position.

5. The method of claim 3, wherein the pair of operator sequences are position transfer operator sequences, and wherein the hybridization of the position transfer operator sequences forms a template for a primer extension reaction which generates a result strand DNA molecule which represents the result of the operation on values of input data which are transferred from a first position to a second position.

6. The method of claim 5, wherein a result strand is sequentially lengthened by a horizontal chain reaction.

* * * * *

```
                         SEQUENCE LISTING (1) GENERAL INFORMATION:

(iii) NUMBER OF SEQUENCES: 6

(2) INFORMATION FOR SEQ ID NO:1:

(i) SEQUENCE CHARACTERISTICS:
          (A) LENGTH: 20 bases
          (B) TYPE: nucleic acid
          (C) STRANDEDNESS: single
          (D) TOPOLOGY: linear (ii) MOLECULE TYPE: DNA (iii) HYPOTHETICAL:

(iv) ANTI-SENSE:

(v) FRAGMENT TYPE:

(vi) ORIGINAL SOURCE:

(xi) SEQUENCE DESCRIPTION: SEQ ID NO:1:

CCTTACCCCT  TTCTACCTCT                                                  20

(2) INFORMATION FOR SEQ ID NO:2:

(i) SEQUENCE CHARACTERISTICS:
          (A) LENGTH: 20 bases
          (B) TYPE: nucleic acid
          (C) STRANDEDNESS: single
          (D) TOPOLOGY: linear (ii) MOLECULE TYPE: DNA (iii) HYPOTHETICAL:

(iv) ANTI-SENSE:

(v) FRAGMENT TYPE:

(vi) ORIGINAL SOURCE:

(xi) SEQUENCE DESCRIPTION: SEQ ID NO:2:

TCGTCTCAGG  GGGGGTGCTT                                                  20

(2) INFORMATION FOR SEQ ID NO:3:
```

(i) SEQUENCE CHARACTERISTICS:
    (A) LENGTH: 50 bases
    (B) TYPE: nucleic acid
    (C) STRANDEDNESS: single
    (D) TOPOLOGY: linear (ii) MOLECULE TYPE: DNA (iii) HYPOTHETICAL:

(iv) ANTI-SENSE:

(v) FRAGMENT TYPE:

(vi) ORIGINAL SOURCE:

(xi) SEQUENCE DESCRIPTION: SEQ ID NO:3:

CACGAAACGA GCGAAAGCAC CCACAACAAG AACCACACAG CACAACCAGA          50

(2) INFORMATION FOR SEQ ID NO:4:

(i) SEQUENCE CHARACTERISTICS:
        (A) LENGTH: 20 bases
        (B) TYPE: nucleic acid
        (C) STRANDEDNESS: single
        (D) TOPOLOGY: linear (ii) MOLECULE TYPE: DNA (iii) HYPOTHETICAL:

(iv) ANTI-SENSE:

(v) FRAGMENT TYPE:

(vi) ORIGINAL SOURCE:

(xi) SEQUENCE DESCRIPTION: SEQ ID NO:4:

GACCAAATAC AGGCTAACAT                                           20

(2) INFORMATION FOR SEQ ID NO:5:

(i) SEQUENCE CHARACTERISTICS:
        (A) LENGTH: 20 bases
        (B) TYPE: nucleic acid
        (C) STRANDEDNESS: single
        (D) TOPOLOGY: linear (ii) MOLECULE TYPE: DNA (iii) HYPOTHETICAL:

(iv) ANTI-SENSE:

(v) FRAGMENT TYPE:

(vi) ORIGINAL SOURCE:

(xi) SEQUENCE DESCRIPTION: SEQ ID NO:5:

CATTCCCCTT CCTCTCCTCC                                           20

(2) INFORMATION FOR SEQ ID NO:6:

(i) SEQUENCE CHARACTERISTICS:
        (A) LENGTH: 5 bases
        (B) TYPE: nucleic acid
        (C) STRANDEDNESS: single
        (D) TOPOLOGY: linear (ii) MOLECULE TYPE: DNA (iii) HYPOTHETICAL:

(iv) ANTI-SENSE:

```
    (v) FRAGMENT TYPE:

(vi) ORIGINAL SOURCE:

(xi) SEQUENCE DESCRIPTION: SEQ ID NO:6:

TCTCC                                                                    5
```